US007143064B2

(12) United States Patent
Picciallo et al.

(10) Patent No.: US 7,143,064 B2
(45) Date of Patent: Nov. 28, 2006

(54) CONTROLLED ENTERTAINMENT SPENDING ACCOUNT

(76) Inventors: Michael J. Picciallo, 50 Carlyle Dr., Bayville, NJ (US) 08721; Peter J. Butch, III, 836 Cooper Landing Rd., Apartment 513-E, Cherry Hill, NJ (US) 08002

( * ) Notice: Subject to any disclaimer, the term of this patent is extended or adjusted under 35 U.S.C. 154(b) by 920 days.

(21) Appl. No.: 09/781,715

(22) Filed: Feb. 12, 2001

(65) Prior Publication Data

US 2001/0034703 A1 Oct. 25, 2001

Related U.S. Application Data

(60) Continuation-in-part of application No. 09/478,051, filed on Jan. 15, 2000, which is a division of application No. 08/876,929, filed on Jun. 16, 1997, now Pat. No. 6,044,360, which is a continuation-in-part of application No. 08/585,173, filed on Apr. 16, 1996, now abandoned.

(60) Provisional application No. 60/244,800, filed on Nov. 1, 2000.

(51) Int. Cl.
*G06Q 40/00* (2006.01)
(52) U.S. Cl. ...................................... 705/39
(58) Field of Classification Search .................. 705/39
See application file for complete search history.

(56) References Cited

U.S. PATENT DOCUMENTS

| 4,454,414 A | 6/1984 | Benton ..................... 235/380 |
| 4,654,793 A | 3/1987 | Elrod ........................ 364/401 |
| 4,725,719 A | 2/1988 | Oncken et al. ............. 235/487 |
| 4,823,265 A | 4/1989 | Nelson ........................ 705/35 |
| 4,837,422 A | 6/1989 | Dethloff et al. ............. 235/380 |
| 4,859,837 A | 8/1989 | Halpern ...................... 235/380 |
| 4,885,685 A | 12/1989 | Wolfberg et al. ........... 364/401 |
| 4,887,950 A | 12/1989 | Halpern ...................... 235/487 |
| 4,906,828 A | 3/1990 | Halpern ...................... 235/379 |
| 4,968,873 A | 11/1990 | Dethloff et al. ............. 235/380 |
| 5,168,372 A * | 12/1992 | Sweetser ..................... 725/29 |
| 5,220,501 A | 6/1993 | Lawlor ....................... 364/408 |
| 5,287,269 A | 2/1994 | Dorrough et al. ........... 364/408 |
| 5,321,241 A | 6/1994 | Craine ........................ 235/380 |
| 5,326,960 A | 7/1994 | Tannenbaum ............... 235/379 |
| 5,331,353 A * | 7/1994 | Levenson et al. ............ 725/29 |
| 5,350,906 A | 9/1994 | Brody et al. ................ 235/379 |
| 5,408,082 A | 4/1995 | Takagi et al. ............... 235/492 |
| 5,450,477 A | 9/1995 | Amarant et al. ............. 379/93 |

(Continued)

FOREIGN PATENT DOCUMENTS

EP 0725376 A2 8/1996

(Continued)

OTHER PUBLICATIONS

For Teens Dubbed Generation Y, Online Shopping Is as Common as a Can of Coke, Internet Retailer, 4 pages, May 2000.*

(Continued)

*Primary Examiner*—Charles R. Kyle
(74) *Attorney, Agent, or Firm*—Synnestvedt & Lechner LLP

(57) ABSTRACT

A computer-based method for allocating funds in pre-established accounts for use by customers, by creating for each customer a customer account file containing a record of funds deposited for the customer, and limiting how the funds in each customer account file may be spent on audio and video entertainment in the form of goods and services in response to command instructions from the fund depositor, wherein the limit on the funds is a limit on transaction amount or a limit according to content on the audio or video entertainment on which the funds may be spent. Computer-based systems implementing the inventive method are also disclosed.

11 Claims, 2 Drawing Sheets

U.S. PATENT DOCUMENTS

| | | | |
|---|---|---|---|
| 5,465,206 A | 11/1995 | Hilt et al. | 705/40 |
| 5,485,518 A * | 1/1996 | Hunter et al. | 725/28 |
| 5,500,513 A | 3/1996 | Langhans et al. | 235/380 |
| 5,530,232 A | 6/1996 | Taylor | 235/380 |
| 5,559,313 A | 9/1996 | Claus et al. | 235/380 |
| 5,566,327 A | 10/1996 | Sehr | 395/600 |
| 5,578,808 A | 11/1996 | Taylor | 235/380 |
| 5,581,663 A | 12/1996 | Zlotin et al. | 395/51 |
| 5,744,787 A | 4/1998 | Teicher | 235/380 |
| 5,826,243 A | 10/1998 | Musmanno et al. | 705/35 |
| 5,845,260 A * | 12/1998 | Nakano et al. | 705/26 |
| 5,852,811 A * | 12/1998 | Atkins | 705/36 |
| 5,864,830 A * | 1/1999 | Armetta et al. | 705/41 |
| 5,870,723 A | 2/1999 | Pare et al. | 705/39 |
| 5,907,831 A | 5/1999 | Lotvin et al. | 705/14 |
| 5,953,170 A * | 9/1999 | Glancy | 359/896 |
| 5,953,710 A * | 9/1999 | Fleming | 705/38 |
| 6,021,943 A | 2/2000 | Chastain | 235/379 |
| 6,032,133 A | 2/2000 | Hilt et al. | 705/40 |
| 6,247,130 B1 * | 6/2001 | Fritsch | 713/171 |
| 6,345,263 B1 | 2/2002 | Matsumoto et al. | 705/41 |
| 6,434,535 B1 * | 8/2002 | Kupka et al. | 705/24 |
| 6,507,727 B1 * | 1/2003 | Henrick | 455/3.06 |
| 6,779,115 B1 * | 8/2004 | Naim | 713/192 |
| 6,796,497 B1 * | 9/2004 | Benkert et al. | 235/380 |
| 6,826,546 B1 * | 11/2004 | Shuster | 705/52 |
| 2001/0034705 A1 * | 10/2001 | Rhoads et al. | 705/39 |
| 2001/0051996 A1 * | 12/2001 | Cooper et al. | 709/217 |
| 2002/0066783 A1 | 6/2002 | Sawin | 235/379 |
| 2002/0111907 A1 * | 8/2002 | Ling | 705/41 |
| 2005/0198533 A1 * | 9/2005 | Walters et al. | 713/201 |

FOREIGN PATENT DOCUMENTS

| | | |
|---|---|---|
| JP | 0002366163 A * | 12/2002 |
| WO | WO 00/28461 | 5/2000 |
| WO | WO 00/43852 | 7/2000 |
| WO | WO 01/50305 | 7/2001 |
| WO | WO 02/08869 | 1/2002 |

OTHER PUBLICATIONS

Students Must Heed the Perils of Plastic; [Final/All Edition] Bill Lubinger. The Plain Dealer. Cleveland, Ohio: Jul. 15, 1995. p. 3.E. Bank on Youth More children are learning to save money, with financial institutions helping by offering no-fee accounts.; [Valley Edition] Barbara Bronson Gray. Los Angeles Times (pre-1997 FullText). Los Angeles, Calif.: Feb. 12, 1993, p. 25.

Brooker, Dena,"Purchasing Cards: The Next Generation,"Modern Publishing, toronto, vol. 39,issue 6, p. 18.

"Visa Wants to Kill Cash, It Hopes Smart Cards Will Become the Payment of Choice,"P.Sinton, San Francisco Chronicle (Oct. 11, 1995).

"Brokers Compete With Lenders,"R.Heady,The Denver post, (Nov. 19, 1995).

"Companies Rush to Say 'Buy—Buy' Over net" S.Garfinkel, San Jose Mercury News (Oct. 1, 1996).

"Verifone Wants to Plug Into Cash," M. Landberg, San Jose Mercury News (Oct. 1, 1996).

"Filing Expenses Via American Express," J. Swenson, Information Week (Jul. 1, 1996).

"Digital Cash," M.Gianturco, Forbes (Aug. 14, 1995).

"The Check's In the Mail: Banks Plan Electronic Payment System," T.Hoffman, Computerworld (Sep. 4, 1995).

"American Express University-About The Cards," (American Express In. 1995).

"Wells Fargo Student Visa Card" (Wells Fargo.com May 12, 1996).

"Payment Card Organization Detail Next Steps On Global Chip Card Specifications," MasterCard International (Apr. 10, 1996).

http://www.itc.icl.ie/products/smartcard/ems/fsucase.htm: "Florida State University"; posted Sep. 1996.

http://www.fsu.edu/~fstime/FS-Times/Volume_ 1/Issue 6/compression.html Compression-Short Takes on Big Subjects (Smart card marches on); posted Apr./May 1996.

http://www.house.gov/castle/banking/norwood3.htm;"Florida State University Aes FSU Card: AMultipurpose Identification Card"; Bill R. Norwood; posted Jul. 10, 1996.

http://www.floridaflambeau.com/Int...isues/1997/021897/news1.this.html:"This year the War Department aims for fairer FSU Card fees"; riva Saker, posted Feb. 12, 1997.

http://www.floridaflambeau.com/Int...1997/042597/news2.technology.html;"The future of technology could find roots in Tallahassee, FSU"; Rachael Knowles;posted Apr. 25, 1997.

"New Web site Enables Teens and Kids to Shop and Save Online," Business Wire (Jan. 26, 1999).

http://www.RocketCash.com/overview/html, Dec. 1998.

"Chase Manhattan,Citibank,MasterCard and Visa join forces to lauch Pilot Program," Master Card International (May 12, 1996).

* cited by examiner

CONTROLLED ENTERTAINMENT SPENDING ACCOUNT

CROSS-REFERENCE TO RELATED APPLICATIONS

This application is a Continuation-In-Part of U.S. patent application Ser. No. 09/478,051 filed Jan. 15, 2000, which, in turn, is a Divisional of U.S. patent application Ser. No. 08/876,929 filed Jun. 16, 1997, which in turn, which issued on Mar. 28, 2000 as U.S. Pat. No. 6,044,360, and which, in turn, is a Continuation-In-Part of U.S. patent application Ser. No. 08/585,173 filed Apr. 16, 1996 now abandoned. This application also claims benefit of Provisional U.S. Patent Application Ser. No. 60/244,800 filed Nov. 1, 2000. The disclosures of all four applications are incorporated herein by reference.

BACKGROUND OF THE INVENTION

The present invention relates to systems for transferring funds, such as periodic allowance payments, by an account holder from a preestablished account to a third party recipient for the funds designated by the account holder for use in purchasing audio and video entertainment in the form of goods and services, for example, over the internet. In particular, the present invention relates to systems for transferring funds in which the account holder is provided with control over how the funds are spent by the third party recipient, either with respect to content or dollar amount.

ATM and debit card systems have gained wide acceptance as means for performing currency transactions. In addition to providing the ability to withdraw cash from a bank account or a credit card line, it is now possible to pay for a point-of-sale transaction with an electronic funds transfer. The computer networks that support ATM and debit card systems make it possible to design transactions that go beyond the conventional exchange of cash for goods or services.

For example, U.S. Pat. No. 5,287,269 discloses a system that uses a card similar to a debit card to control access within a recreational facility such as an amusement park. The card replaces the tickets or tokens conventionally used to control access to amusement rides and arcade games. Thus, a parent may provide a child with a pre-paid card encoded with sufficient credit to ensure an enjoyable day of entertainment.

U.S. Pat. No. 5,321,241 discloses a system that uses a card similar to a debit card to track the spending of casino promotional funds by individual gamblers. The purpose of the card is to prevent gamblers from spending promotional funds on food, or even in other casinos, and to ensure that the promotional funds are only spent on gambling within the issuing casino.

U.S. Pat. No. 5,350,906 discloses a debit card system in which funds may be electronically transferred by an account holder to a third party recipient by the issuance of a fixed currency limit debit card to the recipient at his or her location. One advantage to this system is that the recipient need not have a preestablished ATM or debit card account with the issuing bank or other institution. The system may be used by parents to issue periodic allowance payments or spending money, for example, to a son or daughter away at college in a distant city.

In each of the foregoing systems, however, the funds transferor is not provided with control over how the money is spent by the transferee, or provided with an accounting thereafter. For example, the parent who buys their child the pre-paid card for amusement park access of U.S. Pat. No. 5,287,269 has no way of preventing the child from spending the entire card on video games and cotton candy, or of even knowing later whether this has happened.

The casino issuing the card of U.S. Pat. No. 5,321,241 may be willing to allow a portion of the funds to be spent on food or lodging if a limit could be established, and if it could later know how much money was actually spent on gambling. It would also be useful for the casino to know how the money was actually gambled for purposes of including a gambler on more specific future promotions, such as a slot machine promotion or a blackjack promotion.

A parent issuing the fixed currency limit debit card of U.S. Pat. No. 5,350,906 to a son or daughter away at college has no way to ensure that most of the funds are spent at the college bookstore and not withdrawn as cash or spent on rounds of drinks at the local pub. There is no way for the parent to know how the money was actually spent.

In the coming months, many digitalized forms of entertainment will be available for downloading from the internet for a fee. It is expected, for example, that Napster will charge a fee payable, in part, to the copyright holder of any music file that is copied. Many internet service providers are planning to establish similar sites for selling music content, either by charging a fixed fee per file transfer, or by charging a periodic, i.e., monthly, subscription rate. One can envision similar services becoming available for music videos, movies, video games, and similar digitalized forms of entertainment.

Once digitalized forms of entertainment become available for copying from the internet at a reasonable fee, parents and other fund providers will want to control how much money their children/fund recipients spend per week or per month on obtaining copies of the entertainment, and to control the content of the entertainment that they are able to access.

A need exists for a system in which an account holder may electronically transfer funds from a preestablished account to a third party recipient with limits set on how the money may be spent and then receive a subsequent accounting of how the money was actually spent.

SUMMARY OF THE INVENTION

This need is met by the present invention. It is an object of the present invention to provide a system and a computer-based method in which account holders may transfer funds from preestablished accounts to third party recipients and then receive an itemized statement of how the recipients spent the funds.

Another object of the invention is to provide a system and a computer-based method in which account holders may transfer funds from preestablished accounts to third party recipients and set limits on the goods or services for which the funds are spent, or on the amounts which may be spent for certain goods or services.

Therefore, according to one aspect of the present invention, a system is provided allocating funds in pre-established accounts, including:

a controller process programmed: (a) to process data; (b) to create for each customer a customer account file; and (c) to transfer funds from customer account files to vendors of audio and video entertainment in the form of goods and services, in response to customer command instructions;

an input device for supplying command instructions to the controller processor; and a data storage device associated with the controller processor in which file records of the customer account files created by the controller processor are stored, including information on the amounts of funds deposited for the customer;

wherein the controller processor is programmed to process and store information in the storage device for each customer account, in response to command instructions from fund depositors, limiting how the funds may be spent on the audio and video entertainment, wherein the limit on the funds is either a limit on transaction amounts, or a limit according to content on the audio or video entertainment on which the funds may be spent.

Preferred systems in accordance with this aspect of the present invention permit fund depositors to establish periodic limits on the amount of each transaction by the single transaction, day, week, month or so forth. Another preferred system establishes periodic fund deposits, essentially equivalent to an allowance payment by the day, week or month. The periodic deposit may be performed automatically. The present invention also includes systems in which periodic deposits are made independent of limits on transaction or content. Therefore, according to another aspect of the present invention, a system for allocating funds in pre-established accounts is provided, including:

a controller processor programmed:
(a) to process data;
(b) to create for each customer a customer account file;
(c) to transfer funds from customer account files to vendors of audio and video entertainment in the form of goods and services, in response to customer command instructions; and
(d) to process command instructions from depositors to transfer funds periodically to customer account files;

an input device for supplying command instructions to the controller processor; and a data storage device associated with the controller processor in which file records of the customer account files created by said controller processor are stored, including information on the amounts of funds deposited periodically for the customers by fund depositors.

In yet another preferred system of the present invention, an itemized statement is issued to the fund depositor periodically, i.e., weekly or monthly, providing an accounting of how the funds were spent. In the situation of a parent making an allowance payment, a statement would be sent, similar to a bank or credit card statement, listing the audio and video entertainment in the form of goods and services that were purchased.

Nevertheless, the present invention also includes systems in which such an accounting is not provided, with the primary advantage being the ability to limit transaction amounts. The entertainment content may alternatively or additionally be limited according to genre, artist or content rating.

According to another aspect of the present invention, computer-based methods for operating the systems of the present invention are provided. Methods in accordance with this aspect of the present invention include the steps of:

creating for each customer a customer account file including a primary file containing a record of funds deposited for the customer; and limiting how the funds in the customer account file may be spent on audio and video entertainment in the form of goods and services in response to command instruction from the fund depositor;

wherein the limit on the funds is a limit on transaction amount or a limit according to content on the audio or video entertainment on which the funds may be spent.

Preferred methods according to this embodiment of the invention provide for the establishment of limits in the amounts of transactions. The limit may be periodic, either by the transaction, day, week, month, etc. Another preferred method provides for periodic fund deposits, by the day, week or month. The periodic deposit may be performed automatically. The present invention therefore also includes methods in which periodic deposits are made independent of limits on transaction or content. Therefore, according to another aspect of the present invention, a method for allocating funds in pre-established accounts for use by customers is provided, including:

creating for each customer a customer account file containing a record of funds deposited for the customer for spending on audio and video entertainment in the form of goods and services; and periodically depositing funds into customer account files in response to command instructions from the fund depositor.

The system of the present invention is not limited to currency accounts, but also includes credit accounts, within which the account holders may establish a sub-line of credit that may be drawn against by a third party recipient. Thus, for purposes of the present invention, the term "funds" is defined as including credit lines extended to account holders and third party recipients, as well as currency deposited by account holders. The account holder may require the third party recipient to repay the drawn credit, and the account may thus be employed to control a young person's use of credit, but at the same time teach them how to use the credit responsibly.

The system of the present invention thus provides a tool for a wage earner to provide spending money to a dependent, and at the same time teach the dependent how to budget their money and manage cash flow, while maintaining some control over how the money is spent. Initially, the limits on the types of purchases may be employed as guidance with respect to the appropriateness of purchases, and to discipline the dependent to control their spending habits.

Other features of the present invention will be pointed out in the following description and claims, which disclose the principles of the present invention and the best modes which are presently contemplated for carrying them out.

DETAILED DESCRIPTION OF THE PREFERRED EMBODIMENT

Figure 1:
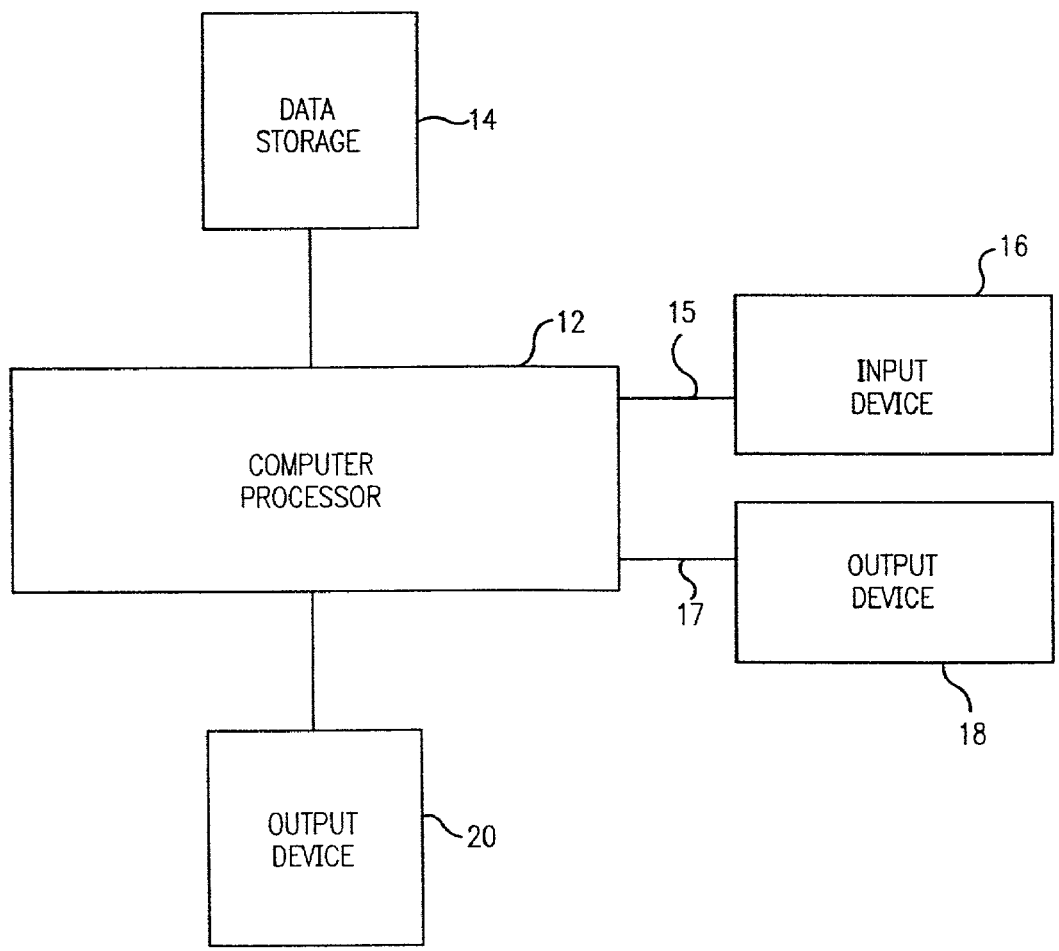
FIG. 1 is a block diagram of the representative system hardware of the present invention.

Referring now to the drawings, and initially FIG. 1, the system of the present invention is comprised of a computer processor 12, herein referred to as a controller processor, coupled to a data storage device 14 such as a memory device and in communication through phone line 15 with at least one input device 16 through which fund transfer command instructions are received and through phone line 17 with at least one output device 18 through which electronic fund transfers are executed. The embodiment depicted in FIG. 1 also includes output device 20 for generating a file record containing information on electronic fund transfer payees, which is described in greater detail hereinafter.

The system may be a local, entirely self-contained internal network of input and output devices under the absolute control of the system operator, as would be the case when the system is employed by a casino or an amusement park. Alternatively, the system may be in communication with an external network of input and output devices, such as a banking, credit or ATM network, or the internet.

The controller processor of the present invention can be essentially any mainframe computer processor or plurality of processors, or any computer workstation capable of interfacing with the network to be employed and executing the volume of command instructions supplied by the network. The control programs to be run by the controller processor for operating the system of the present invention are essentially conventional, once the objectives of the present invention are described.

The data storage devices associated with the controller processor can be essentially any conventional memory storage device, typically a semiconductor memory in combination with a hard disk drive or a CD-ROM drive with a compact disk. The memory device is employed to store information on the preestablished accounts from which account holders transfer funds to third party recipients. It will be assumed for purposes of the present invention that the system operators have methods of establishing accounts and placing money or establishing credit lines within these accounts and that proper accounting procedures are in place to track the various transactions, all of which are standard in the industry and well known to those skilled in the art.

For local self-contained systems, the controller processor is in communication with the internal network of input and output devices through cables or telecommunication lines. When the system is in communication with an external network, telecommunication lines are nearly exclusively employed. Telecommunication lines are defined as including wireless communications.

Essentially any input device capable of supplying command instructions to the controller processor from account holders and third party recipients is suitable for use as an input device for the present invention. For purposes of the present invention, command instructions will be considered to be issued by an account holder or a third party recipient if the instructions are issued by another individual on their behalf. For example, a bank employee may issue command instructions requested by an account holder to transfer funds for access by the third party recipient. A store employee may issue command instructions requested by the third party recipient to obtain an electronic fund transfer to pay for goods and services in a point-of-sale purchase.

External banking, credit and ATM networks have already been established using as combination input/output devices stations that employ magnetic card readers in combination with manual input devices such as keypads, touch screens and the like, through which information required for the transaction may be entered, such as the transaction amount, account password, and so forth. One example of such a station is an ATM. Another example is the magnetic card reader/keypad employed for point-of-sale transactions to obtain bank approval of credit card and debit card transactions. Such stations also serve as output devices for the systems that they serve. The ATM is adapted to deliver cash, print a receipt and relay messages from the network processor via a CRT. The magnetic card reader relays messages from the network processor via an LCD, and is also adapted to print a receipt. When the system of the present invention is adapted to communicate with such an external network, the fund transfer command instructions may be issued by the third party recipients through such input devices, which will also function as output devices for the system, delivering cash, relaying messages from the controller processor and printing receipts.

Otherwise, essentially any conventional manual input device may be employed, particularly with local, internally self-contained systems in accordance with the present invention or with systems operated over the internet. Such devices include keypads, touch screens, mouse and cursor systems, and the like. It is not essential that magnetically encoded cards and magnetic card readers be employed.

Likewise, any device capable of relaying messages from the controller processor to the account holder or third party recipient is also suitable for use as an output device with systems of the present invention. Examples of devices include CRT's, LCD's, printers, and the like. In the simplest of local, internally self-contained systems, the machine vending of cash and printing of receipts is not contemplated. Instead, an employee of the system operator would attend to such tasks, receiving prompts from the controller processor through an output display device.

A particular advantage of the present invention is that the account holder is provided with a periodic accounting of how the third party recipient of funds has spent the money accessible to them. This would be in the form of a statement issued daily, weekly, monthly, and the like, detailing cash withdrawals and debit card transfers. This is also performed by essentially routine simple means ranging from e-mail to desktop publishing, or as complex as the systems employed by banking and credit institution for generating periodic statements for conventional accounts. Such means are very well known and require no description here.

As noted above, it is not necessary that the system of the present invention employ magnetically encoded cards to provide system access to account holders and third party recipients. Instead, access to the system may be obtained through the entry of the requisite information by way of a manual input device, such as a keyboard, that is in communication with the system, for example, through the internet. The information may be entered directly by the account holder or third party recipient, or on their behalf by an employee of the system operator or fund transfer payee.

However, the use of magnetic cards encoded with account information is particularly preferred for the sake of convenience. The cards also eliminate the need for the system operator to hire employees to receive and enter information that would be submitted directly to the system by the account holder or third party recipient. In other words, it is more economical for a bank to permit a third party recipient to access cash via an ATM, rather that require the recipient to present themselves to a bank teller. Magnetic cards issued to third party recipients will be encoded with an identifier correlated to the secondary file of the preestablished account. The encoding of information fields on the magnetic stripe of a magnetic card is well known and essentially conventional and also need not be described here.

Figure 2:
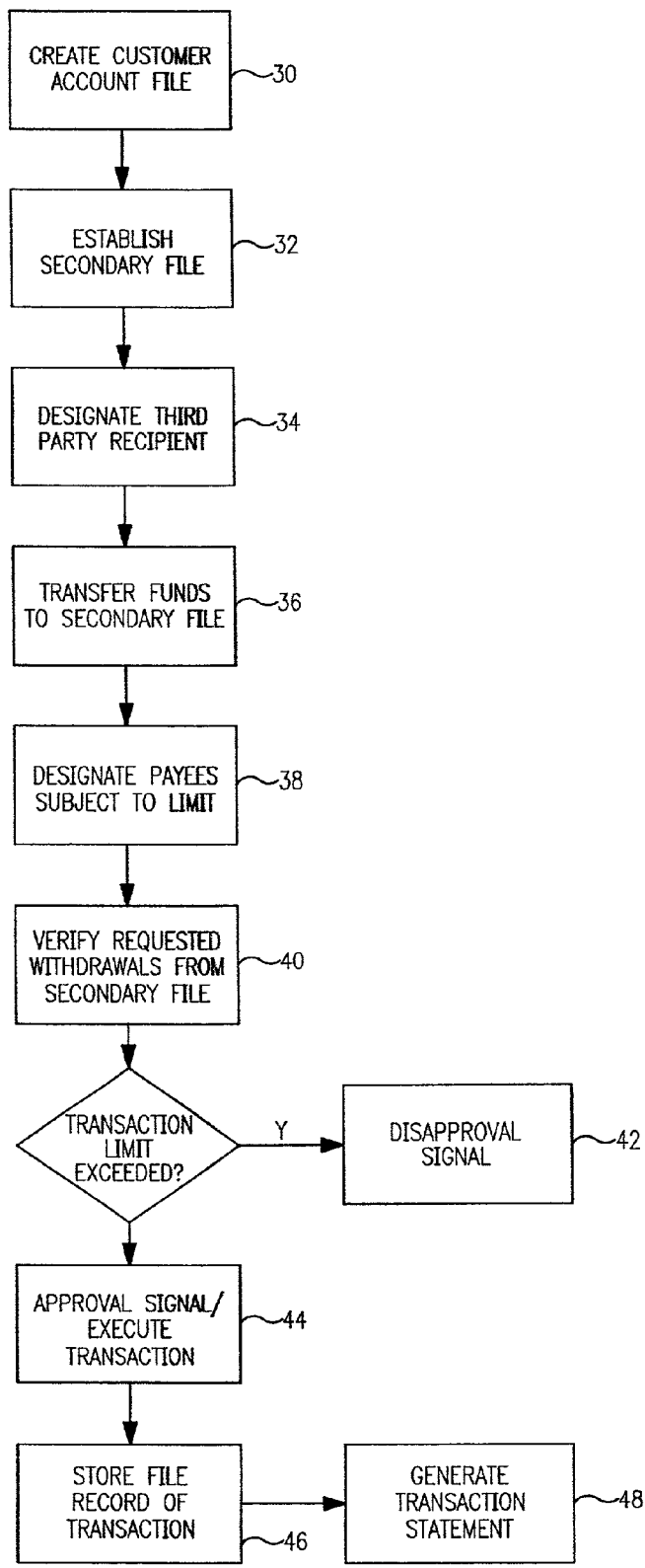
FIG. 2 is a flow chart showing the operation of the system of the present invention.

Turning now to FIG. 2, there is illustrated in block diagram form the computer-based method of the present invention, that shall be discussed with reference to the system depicted in FIG. 1. Typically, the computer processor 12 creates in memory device 14 associated therewith customer account file 30 containing a record of funds deposited by the account holder. The account holder inputs command instructions 32 input device 16, typically a computer terminal or work station, which are transmitted by telephone lines 15 to computer processor 12 to establish a secondary file in the customer account. The account customer then inputs command instructions 34, usually contemporaneously with the establishment of the secondary file using the same input device, to designate a third party recipient permitted access to the secondary file. Alternatively, the third party recipient can be designated at a later time from the same or different input device.

The account customer then inputs command instructions 36 to transfer to the secondary file at least a portion of the record of funds contained in the primary file representing deposited funds accessible to the third party recipient. Again, this is usually done contemporaneously with the establishment of the secondary file and the designation of a third party recipient using the same input device. However, this step can also be performed at a later time from the same or different input device.

In the embodiment illustrated in FIG. 2, the account customer inputs command instructions 38 to designate payees of funds to be withdrawn by the third party recipient subject to a limit on the amount of funds that may be withdrawn. Again, this may be done contemporaneously with the establishment of the secondary file, the designation of the third party recipient and the transfer of funds from the primary file using the same input device, or this step may be performed at a different time using the same or different input device.

The computer processor 12 then verifies each withdrawal from the secondary file requested by the third party recipient 40 to determine whether it is subject to a limit in the amount of the transaction, and whether that limit has been exceeded. At the same time, the computer processor verifies that there are funds available in the secondary file to complete the transaction (not shown). The computer processor 12 sends a disapproval signal 42 if there is a transaction limit that has been exceeded, or an approval signal 44 if there is no transaction limit or if there is a transaction limit that has not been exceeded, along telephone lines 17 to output device 18. The approval or disapproval signal is also conditioned on the availability of funds in the secondary file (not shown). Typically output device 18 is part of a computer terminal or workstation that also includes an input device (not shown) through which third party recipients input electronic fund transfer requests.

The computer processor 12 also stores in memory device 14 associated therewith a file record of information 46 on each selected payee of funds and corresponding payment amounts. Periodically, the computer processor 12 provides to the account holder 48 the file record of information on fund payees and corresponding payment amounts in the form of an itemized statement generated by output device 20, typically a high volume printer.

The controlled spending accounts of U.S. Pat. No. 6,044,360 can be established allocating a certain amount that a child or other fund recipient can spend per week or per month on entertainment. In the context of entertainment supplied over the internet, this would include music files, music video files, movie files or video game files. The amount set by the parent or other fund provider can be a fixed amount corresponding to a predetermined number of file transfers for entertainment providers that charge per file transfer, or it can all or part of a subscription fee for entertainment providers that charge a flat rate periodic subscription fee.

The entertainment need not be derived from the internet. The present invention may also be used with other pay-per-use services, such as pay-per-view movies and music videos or pay-per-use video games offered by cable television providers. Because digital cable television transmission is not universal, the invention is thus applicable as well to non-digital forms of entertainment.

The entertainment need not even be derived from a remote transmission. The invention is applicable as well to retail outlets such as establishments that rent or sell video taped and digital movies, music videos and video games, or music in the form of compact discs, analog or digital audio tapes, and the like. Store accounts funded periodically by parents or other fund providers can be established in which the parent or fund provider can control the content of the movie, music, music video or video game that their child/fund recipient is able to purchase or rent.

The parental controls of U.S. Pat. No. 6,044,360 can thus be set to prevent access to entertainment that a parent or other fund provider finds inappropriate for their child or fund recipient. For example, music can be blocked according to genre, be it psychedelic, heavy metal, rap or hip-hop, or particular artists may be blocked. The existing voluntary music ratings format could be employed to block music bearing certain content ratings. The invention can also be adapted to whatever music rating system may be developed in the future.

Similar controls can be established for music videos so that inappropriate artists, genres, or ratings may be blocked. Likewise, movies having inappropriate genres or content ratings may also be blocked. Finally, video games may also be blocked according to genre or based upon the voluntary system presently in effect for rating the content of video games. Under any circumstance, a parent or other fund provider will be able to block a specific, individual song, music video, movie or video game.

Alternatively, the entertainment supplier may establish an "adult" category of music, music videos, movies or video games that parents or other fund providers are able to block. The advantage supplied by the present invention is that the entertainment supplier need not ban all of those under 18 from accessing this category. Instead, only the category needs to be established, with parents or other fund providers being given control over at what age, if ever, their child/fund recipient may access the category using the funds provided.

The fund provider does not become an absolute censor. Rather, the fund provider is given the opportunity to designate certain classes of entertainment that they will not pay for, leaving the fund recipient to spend their own funds to obtain access.

The supplier of the entertainment may only offer the parental controls, and need not offer the controlled spending account. For example, Visa-branded controlled spending allowance cards are presently being issued that can be loaded periodically with a set amount of an allowance, which can then be spent on entertainment. Thus, the spending control portion can be provided by a card-issuing institution, while the content control will be supplied by the entertainment provider. By accepting the controlled spending card, the entertainment provider essentially supplies parents or other fund providers with a means to control the amount their children/fund recipients are spending weekly or monthly independently or jointly coupled to the content controls that the entertainment provider has established.

The computer-based methods of the present invention do not require special or unique computer programming for operation. Instead, the system features described above can be programmed following conventional techniques by individuals of ordinary skill.

As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

What is claimed is:

1. A computer-based method for allocating parental funds in preestablished accounts for use by children, comprising;
    providing a bank or credit account containing parental funds for allocation to at least one child;
    creating a secondary account file with an internet music file supplier accessible by a child for spending on internet music purchases; and
    periodically transferring directly and automatically to said secondary account file from said bank or credit account an allowance payment for use by said child to purchase and transfer music files over the internet using a personal computer;
    wherein said steps of creating a secondary account file and periodically transferring funds from said bank or credit account to said secondary account are performed using information supplied by said parent over the internet using a personal computer.

2. The method of claim 1, further comprising the step of storing information on said internet music purchases.

3. The method of claim 2, further comprising the step of supplying to said parent said purchase information.

4. The method of claim 3, wherein said supplying step is performed periodically.

5. The method of claim 1, wherein said allowance payment is transferred weekly or monthly.

6. The method of claim 1, further comprising the step of limiting how said allowance payment in said secondary account file may be spent in response to command instructions from said fund depositor, wherein said limit on said allowance payment is a limit on transaction amount or a limit according to music content.

7. The method of claim 1, wherein said limit on said allowance payment is a limit on transaction amount.

8. The method of claim 7, wherein said limit on transaction amount is a periodic limit.

9. The method of claim 8, wherein said limit on transaction amount is a weekly or monthly limit.

10. The method of claim 6, wherein said limit on said allowance payment is a content limit.

11. The method of claim 10, wherein said content limit is according to artist, genre or content rating.

* * * * *